US010933874B2

(12) United States Patent
Cho

(10) Patent No.: US 10,933,874 B2
(45) Date of Patent: Mar. 2, 2021

(54) BRAKING CONTROL SYSTEM AND METHOD FOR AN ENVIRONMENTALLY FRIENDLY VEHICLE

(71) Applicants: HYUNDAI MOTOR COMPANY, Seoul (KR); KIA MOTORS CORPORATION, Seoul (KR)

(72) Inventor: Sung Hyun Cho, Yongin-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 70 days.

(21) Appl. No.: 16/375,370

(22) Filed: Apr. 4, 2019

(65) Prior Publication Data
US 2020/0164880 A1  May 28, 2020

(30) Foreign Application Priority Data

Nov. 12, 2018  (KR) .......................... 10-2018-0137844

(51) Int. Cl.
| | | |
|---|---|---|
| *B60W 30/18* | (2012.01) | |
| *F16D 66/02* | (2006.01) | |
| *B60W 10/08* | (2006.01) | |
| *F16D 61/00* | (2006.01) | |
| *F16D 66/00* | (2006.01) | |

(52) U.S. Cl.
CPC ...... *B60W 30/18127* (2013.01); *B60W 10/08* (2013.01); *F16D 61/00* (2013.01); *F16D 66/021* (2013.01); *B60T 2270/60* (2013.01); *F16D 2066/005* (2013.01)

(58) Field of Classification Search
CPC ........... B60W 30/18127; B60W 10/08; B60W 10/26; F16D 66/021; F16D 2066/005; F16D 61/00; B60L 58/10; B60L 58/12; B60T 2270/60
USPC ................. 303/152, 3, 20; 180/65.23, 65.26, 180/65.285; 701/22
See application file for complete search history.

(56) References Cited

U.S. PATENT DOCUMENTS

| | | | | |
|---|---|---|---|---|
| 9,616,757 | B2* | 4/2017 | Lee ..................... | B60L 15/2054 |
| 9,834,199 | B2* | 12/2017 | Yoon ...................... | B60L 58/12 |
| 10,625,627 | B2* | 4/2020 | Duan ................ | H02J 7/007184 |
| 2016/0332529 | A1* | 11/2016 | Kumazawa ............... | B60L 1/02 |
| 2019/0315243 | A1* | 10/2019 | Kodera ............... | B60L 15/2045 |

* cited by examiner

*Primary Examiner* — Pamela Rodriguez
(74) *Attorney, Agent, or Firm* — Lempia Summerfield Katz LLC

(57) ABSTRACT

A braking control system and a braking control method for an environmental-friendly vehicle may forcibly discharge a part of the current charge amount of a battery when it is determined that the current charge amount of the battery reaches a maximum charge amount state by regenerative braking to exclude a regenerative braking prohibition condition according to the maximum charge amount state of the battery. The braking of the vehicle is thereby always performed by a sum of the regenerative braking amount and the hydraulic braking amount to reduce a braking load concentrated on a disk of a hydraulic braking brake.

10 Claims, 5 Drawing Sheets

– UPON REGENERATIVE BRAKING OPERATION –

– IN REGENERATIVE BRAKING PROHIBITION MODE –

BRAKING CONTROL SYSTEM AND METHOD FOR AN ENVIRONMENTALLY FRIENDLY VEHICLE

CROSS-REFERENCE TO RELATED APPLICATION

This application claims under 35 U.S.C. § 119(a) the benefit of priority to Korean Patent Application No. 10-2018-0137844 filed on Nov. 12, 2018, the entire contents of which are incorporated herein by reference.

BACKGROUND

(a) Technical Field

The present disclosure relates to a braking control system and method for an environmental-friendly vehicle. More particularly, the disclosure relates to a braking control system and method for an environmental-friendly vehicle, which may exclude a regenerative braking prohibition condition related to the charged amount of a battery to induce so a braking of the vehicle is performed by a sum of regenerative braking and hydraulic braking, thereby reducing a braking load concentrated on a disk of a hydraulic braking brake.

(b) Description of the Related Art

Environmental-friendly vehicles, such as a hybrid vehicle and a pure electric vehicle, may obtain fuel efficiency improvement and exhaust gas reduction by traveling and charging a battery by using a motor.

For this purpose, a traveling mode of the environmental-friendly vehicle includes an EV mode that travels by power of only a motor, an HEV traveling mode capable of obtaining the fuel efficiency saving effect as compared with the acceleration using only an engine through the power distribution of the engine and the motor, a regenerative braking mode for recovering braking and inertia energy of the vehicle upon traveling by braking or inertia of the vehicle through power generation in the motor to charge it in the battery, and the like.

As illustrated in FIG. 1, the regenerative braking amount in the regenerative braking mode is generated upon traveling at a constant speed of a certain speed or less and may be largely obtained upon deceleration (e.g., upon braking).

In addition, as illustrated in FIG. 2, a regenerative brake pressure of the environmental-friendly vehicle is determined by a sum of the regenerative braking amount by the motor and the hydraulic braking amount by the hydraulic braking device, and at this time, a ratio of the regenerative braking amount and the hydraulic braking amount is distributed at a predetermined distribution ratio.

Meanwhile, the regenerative braking of the environmental-friendly vehicle is not allowed unconditionally when braking or power generation is required. The regenerative braking is allowed only when the battery is chargeable and is not allowed when the battery charge is not required.

That is, when the battery charge amount SOC is the maximum charge state (e.g., the SOC 100% fully charged state), the battery is no longer required to be charged due to the regenerative braking. The regenerative braking is prohibited considering the durability life of the battery.

More specifically, a problem occurs when the battery charge amount SOC is the maximum charge state and the battery is charged by allowing the regenerative braking. The battery life is reduced by battery deterioration (e.g., lithium ion precipitation, or the like) due to battery overcharge. In order to prevent the problem above, regenerative braking prohibition logic is executed when the battery charge amount SOC is the maximum charge state.

On the other hand, when the battery charge amount SOC is the maximum charge state, the braking of the vehicle is performed by the 100% hydraulic brake pressure according to the regenerative braking prohibition logic.

As a result, a problem occurs when the braking of the vehicle is performed by the 100% hydraulic brake pressure. A braking load is concentrated on a disk included in a hydraulic braking device of the vehicle, which largely increase the temperature of the disk as compared with regenerative braking cooperation, thereby shortening the life of the disk.

In addition, when the braking of the vehicle is performed by the 100% hydraulic brake pressure, an increase in the size of the disk is necessary in order to reduce the concentration of the braking load on the disk. This results in weight increase and cost increase.

The above information in this Background section is disclosed only to enhance understanding of the background of the disclosure and accordingly may contain information that does not form the prior art that is already known in this country to a person of ordinary skill in the art.

SUMMARY

The present disclosure is intended to solve the above-mentioned conventional problems. An object of the present disclosure is to provide a braking control system and method for an environmental-friendly vehicle, which may forcibly discharge a part of the current charge amount of the battery when it is determined that the current charge amount of the battery reaches the maximum charge amount state by the regenerative braking to exclude the regenerative braking prohibition condition according to the maximum charge amount state of the battery, thereby inducing so that the braking of the vehicle is always performed by a sum of the regenerative braking amount and the hydraulic braking amount to reduce the braking load concentrated on the disk of the hydraulic braking brake.

For achieving the object, an embodiment of the present disclosure provides a braking control system for an environmental-friendly vehicle. The braking control system includes a battery control unit for providing the current charge amount information of a battery and a hybrid control unit for performing a control of discharging a part of the current charge amount of the battery before actual regenerative braking. The control is performed when the current charge amount of the battery is determined to reach the maximum charge amount by predicting whether the current charge amount of the battery provided by the battery control unit reaches the maximum charge amount of the battery by power generation of the regenerative braking of a motor when the regenerative braking of the motor is performed at or above a certain vehicle speed.

For achieving the object, another embodiment of the present disclosure provides a braking control method for an environmental-friendly vehicle. The braking control method includes providing the current charge amount information of a battery to a hybrid control unit by a battery control unit and performing a control of discharging a part of the current charge amount of the battery before actual regenerative braking. The control is performed when the current charge amount of the battery is determined to reach the maximum charge amount by predicting whether the current charge amount of the battery provided by the battery control unit reaches the maximum charge amount of the battery by power generation according to the regenerative braking of the motor in the hybrid control unit.

In particular, the hybrid control unit executes the discharge control when a sum of the current charge amount of the battery, which is provided by the battery control unit, and the battery chargeable amount by the regenerative braking of the motor is greater than the maximum charge amount of the battery.

The discharge control by the hybrid control unit is performed through a control of driving the motor for a certain time in the hybrid control unit.

Alternatively, the discharge control by the hybrid control unit is performed through a control of driving one selected among a defroster, a fog lamp, a heater, and an air-conditioner in the hybrid control unit.

The hybrid control unit receives current usage information of a FATC control unit to selectively drive the heater or the air-conditioner.

The present disclosure provides the following effects through the above configurations.

First, when it is determined that the current charge amount of the battery reaches the maximum charge amount state by the regenerative braking, it is possible to forcibly discharge a part of the current charge amount of the battery to exclude the regenerative braking prohibition condition according to the maximum charge amount state of the battery, thereby excluding the braking of the vehicle from being performed by the 100% hydraulic brake pressure.

Second, by excluding the regenerative braking prohibition condition according to the maximum charge amount state of the battery, it is possible for the braking of the vehicle not to be performed by the 100% hydraulic brake pressure. Rather, the braking of the vehicle will always be performed by a sum of the regenerative braking amount and the hydraulic braking amount, thereby reducing the braking load concentrated on the disk of the hydraulic braking brake by conventionally performing the braking by the 100% hydraulic brake pressure, which prolongs the life of the disk and increases the durability thereof.

Other aspects and embodiments of the disclosure are discussed infra.

It is understood that the terms "vehicle", "vehicular", or other similar terms as used herein are inclusive of motor vehicles in general, such as passenger automobiles, which include sports utility vehicles (SUV), buses, and trucks, various commercial vehicles, watercraft, which include a variety of boats and ships, aircraft, and the like. Motor vehicles may also include hybrid vehicles, electric vehicles, plug-in hybrid electric vehicles, hydrogen-powered vehicles, and other alternative fuel vehicles (e.g., fuels derived from resources other than petroleum). As referred to herein, a hybrid vehicle is a vehicle that has two or more sources of power, for example both gasoline-powered and electric-powered vehicles.

The above and other features of the disclosure are discussed infra.

BRIEF DESCRIPTION OF THE DRAWINGS

The above and other features of the present disclosure is described in detail with reference to certain embodiments thereof illustrated the accompanying drawings, which are given hereinbelow by way of illustration only and are not limitative of the present disclosure, and wherein.

Figure 1:
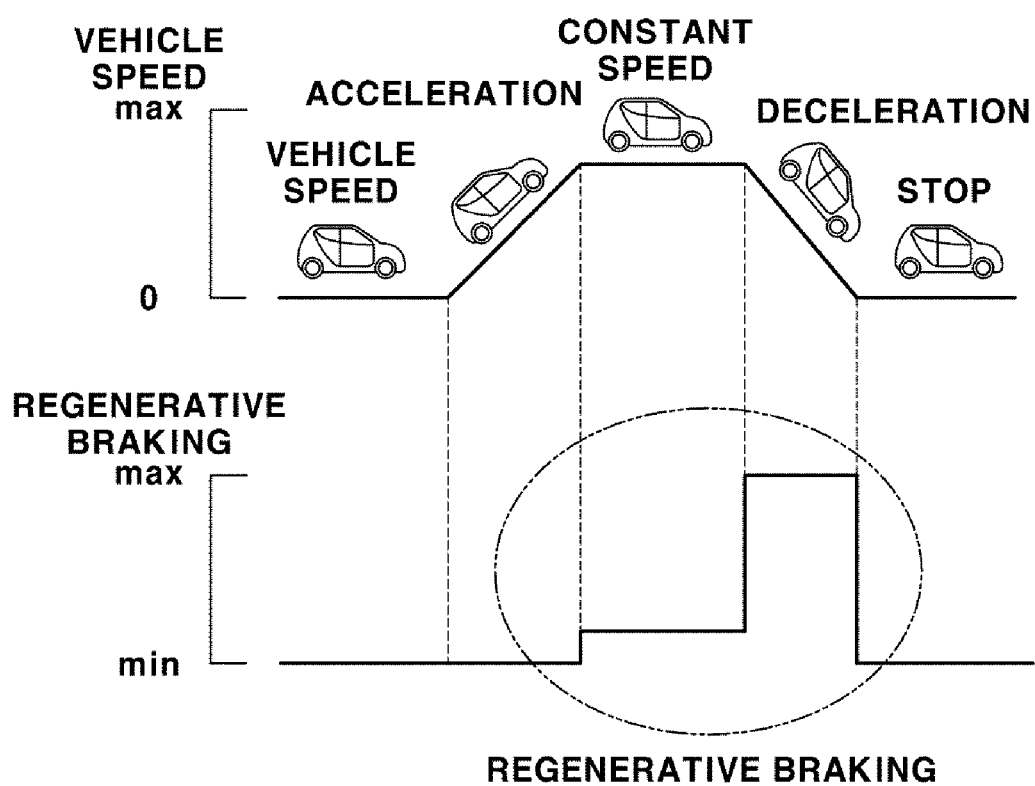
FIG. 1 is a schematic diagram explaining the time point at which regenerative braking is performed during traveling of an environmental-friendly vehicle.
Figure 2:
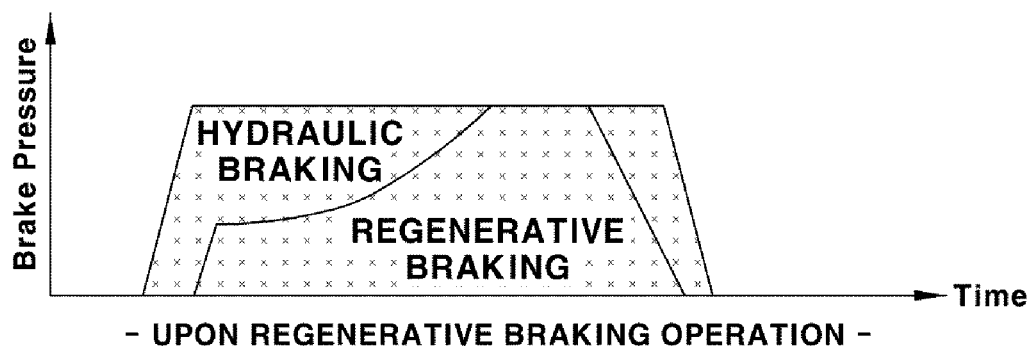
FIG. 2 is a graph illustrating the brake pressure distribution amount upon regenerative braking of the environmental-friendly vehicle and the hydraulic braking amount in a regenerative braking prohibition condition.
Figure 2:
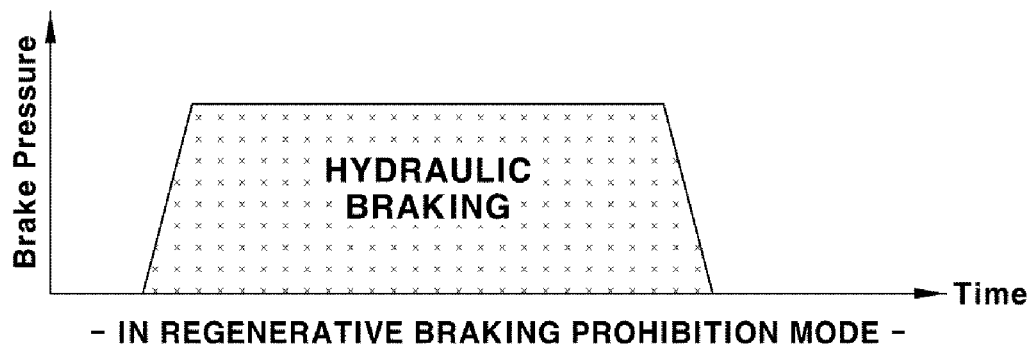

It should be understood that the appended drawings are not necessarily to scale, presenting a somewhat simplified representation of various features illustrative of the basic principles of the disclosure. The specific design features of the present disclosure as disclosed herein, including, for example, specific dimensions, orientations, locations, and shapes will be determined in section by the particular intended application and use environment.

In the figures, reference numbers refer to the same or equivalent sections of the present disclosure throughout the several figures of the drawing.

DETAILED DESCRIPTION

Hereinafter, embodiments of the present disclosure are described in detail with reference to the accompanying drawings.

First, in order to facilitate understanding of the present disclosure, it is described that a normal braking control of an environmental-friendly vehicle is performed by a cooperative control between regenerative braking and hydraulic braking as follows.

Figure 3:
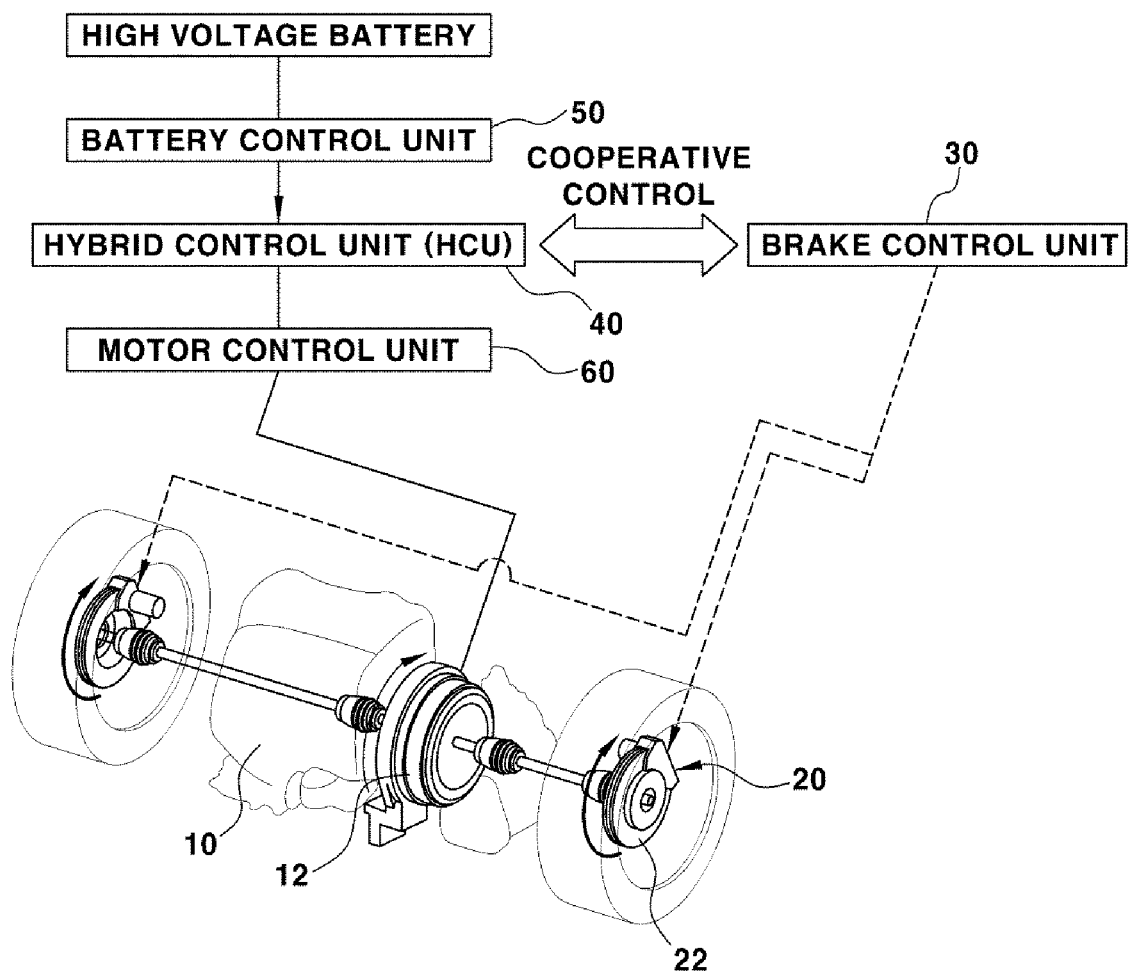
FIG. 3 is a block diagram illustrating a system for a braking control of the environmental-friendly vehicle.

FIG. 3 is a block diagram illustrating a system for a braking control of an environmental-friendly vehicle.

As seen in FIG. 3, the environmental-friendly vehicle, such as a hybrid vehicle, has an engine 10 and a motor 12, which are combined as a traveling power source, and a hydraulic braking device 20 that includes a disk 22 mounted on a wheel.

The hydraulic braking device 20 is operated by a control of a brake control unit 30. The motor 12 is operated by a control of a motor control unit 60 by the command of a hybrid control unit 40.

The braking of the environmental-friendly vehicle is performed by a sum of the hydraulic braking amount according to an operation of the hydraulic braking device 20 and the regenerative braking amount according to the regenerative braking of the motor 12 by the cooperative control between the brake control unit 30 and the hybrid control unit 40.

In addition, the power recovered through power generation upon regenerative braking of the motor 12 is charged in a battery. A battery control unit 50 (e.g., Battery Management System (BMS)) provides the current charge amount SOC information of the battery to the hybrid control unit 40.

Therefore, the brake pressure of the environmental-friendly vehicle is determined by a sum of the regenerative brake pressure by the motor 12 and the hydraulic brake pressure by the hydraulic braking device 20 by the cooperative control between the brake control unit 30 and the hybrid control unit 40. At this time, a ratio of the regenerative braking amount and the hydraulic braking amount is distributed at a predetermined distribution ratio.

Meanwhile, as described above, when the current charge amount SOC of the battery is the maximum charge state (e.g., SOC 100% fully charged state), the battery is no longer required to be charged due to the regenerative braking. The regenerative braking is prohibited considering the durability life of the battery.

As a result, a problem occurs in that when the battery charge amount SOC is the maximum charge state, the braking of the vehicle is performed by the 100% hydraulic brake pressure according to regenerative braking prohibition logic. Accordingly, a braking load is concentrated on a disk included in a hydraulic braking device, which largely increases the temperature of the disk as compared with regenerative braking cooperation, thereby shortening the life of the disk.

In order to solve the problem, the present disclosure may exclude the regenerative braking prohibition condition according to the maximum charge amount state of the battery so that the braking of the vehicle is not performed by the 100% hydraulic brake pressure. Rather, the braking is always performed by a sum of the regenerative braking amount and the hydraulic braking amount, thereby preventing the braking load from being concentrated on the disk included in the hydraulic braking device by conventionally performing the braking by the 100% hydraulic brake pressure, thereby prolonging the life of the disk and increasing the durability thereof.

Figure 4:
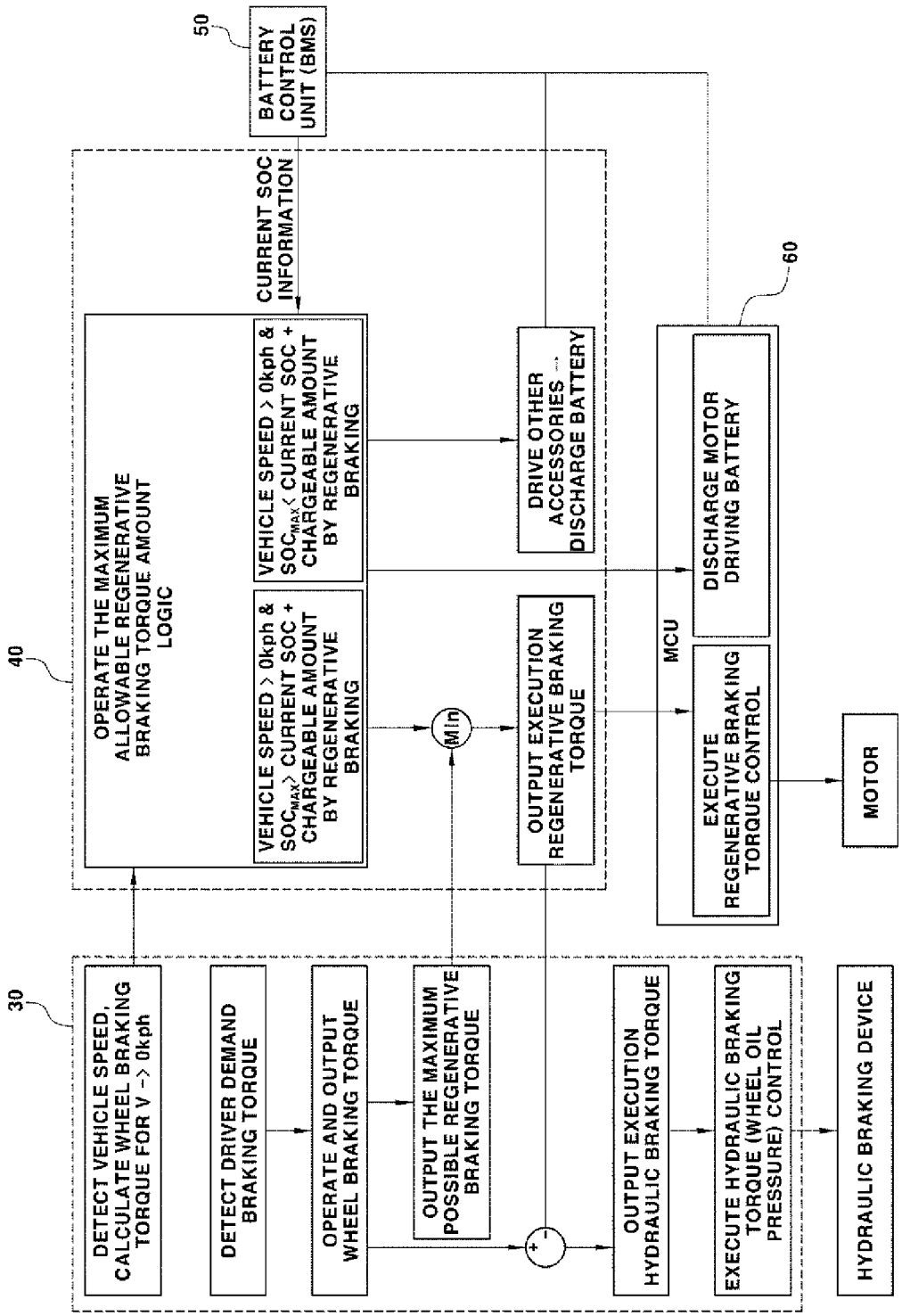
FIG. 4 is a control block diagram illustrating a braking control procedure of the environmental-friendly vehicle according to the present disclosure.
Figure 5:
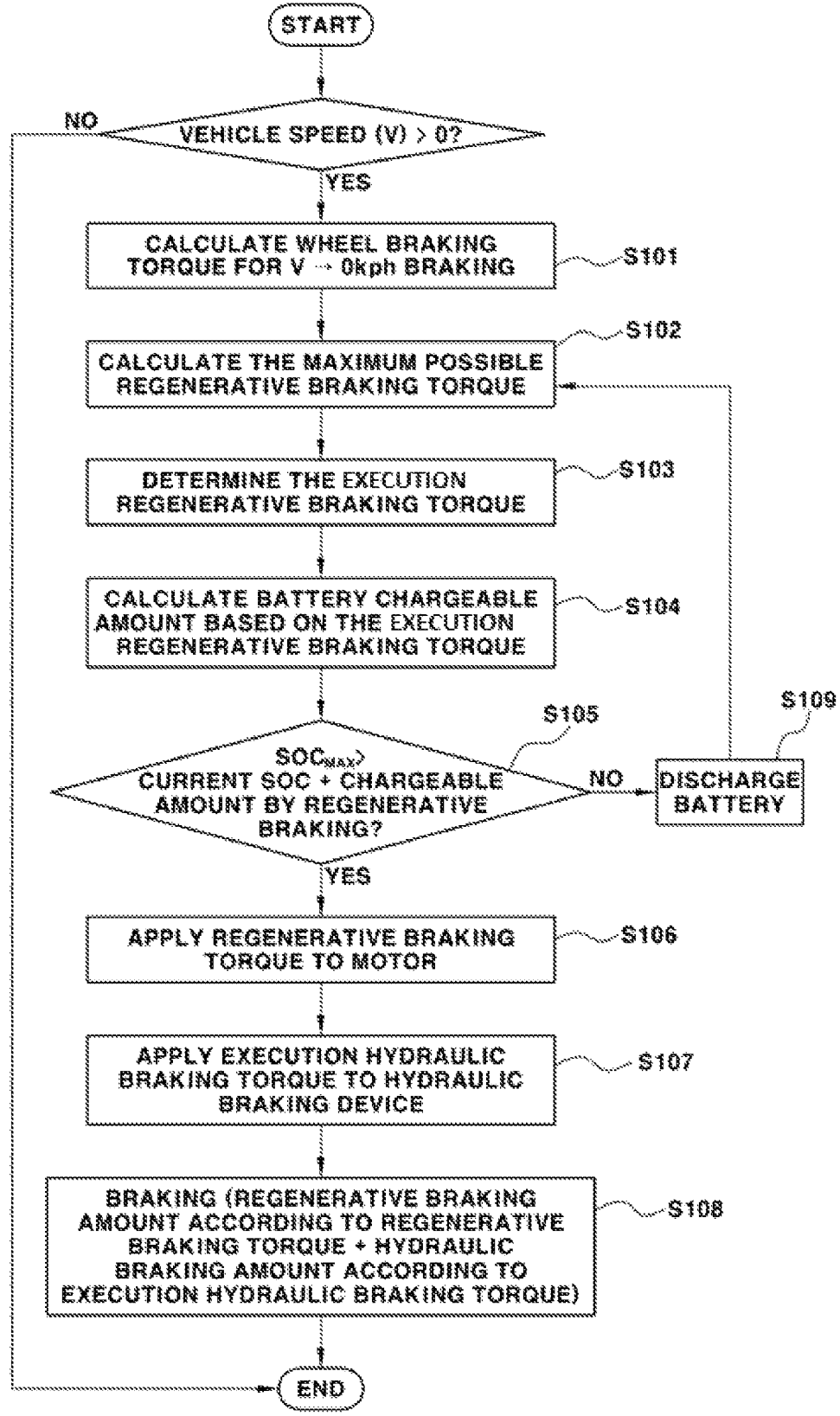
FIG. 5 is a flowchart illustrating the braking control procedure of the environmental-friendly vehicle according to the present disclosure.

FIG. 4 is a control block diagram illustrating a braking control procedure of the environmental-friendly vehicle according to the present disclosure. FIG. 5 is a flowchart illustrating the braking control procedure of the environmental-friendly vehicle according to the present disclosure.

When a driver depresses a brake pedal at or above a certain vehicle speed, the brake control unit 30 detects a driver demand braking torque based on a brake pedal stroke or the like and calculates a wheel braking torque corresponding to the current vehicle speed by using map data or the like S101.

In addition, when outputting the wheel braking torque, the brake control unit 30 calculates and outputs the maximum possible regenerative braking torque that may be a part of the wheel braking torque together by using predetermined map data or the like S102.

At this time, the hybrid control unit 40 operates the maximum allowable regenerative braking torque upon braking at the corresponding vehicle speed by a predetermined logic.

Subsequently, the hybrid control unit 40 compares the operated maximum allowable regenerative braking torque with the maximum possible regenerative braking torque output by the brake control unit 30 to determine a smaller regenerative braking torque as an execution regenerative braking torque actually applied to the motor S103.

In addition, the hybrid control unit 40 calculates the battery chargeable amount, which may be obtained by power generation of the regenerative braking of the motor when the execution regenerative braking torque, which is determined as described above, has been applied to the motor by using the predetermined map data or the like S104.

In addition, the execution regenerative braking torque determined by the hybrid control unit 40 is transmitted to a subtractor of the brake control unit 30.

Particularly, the hybrid control unit 40 compares a sum of the current charge amount CURRENT SOC provided by the battery management system, that is the battery control unit 50 and the battery chargeable amount that may be obtained by power generation of the motor by the execution regenerative braking torque, with the maximum charge amount $SOC_{MAX}$ (battery 100% fully charged state) of the battery S105.

As a comparison result, when a sum of the current charge amount CURRENT SOC of the battery and the battery chargeable amount is smaller than the maximum charge amount $SOC_{MAX}$ of the battery, the hybrid control unit 40 instructs the execution of the regenerative braking torque control according to the execution regenerative braking torque determined in the step S103 to the motor control unit 60, thereby the Motor Control Unit (MCU) 60 applies the regenerative braking torque corresponding to the execution regenerative braking torque to the motor S106.

At this time, when the execution regenerative braking torque determined by the hybrid control unit 40 is transmitted to the subtractor of the brake control unit 30, the brake control unit 30 applies the execution hydraulic braking torque, which is a torque obtained by subtracting the execution regenerative braking torque from the wheel braking torque, to the hydraulic braking device 20 S107.

Therefore, the braking of the vehicle is performed by a sum of the regenerative braking amount according to the regenerative braking torque applied to the motor by the motor control unit 60 and the hydraulic braking amount according to the execution hydraulic braking torque applied to the hydraulic braking device 20 by the brake control unit 30 S108.

Meanwhile, when it is determined to reach the maximum charge amount by predicting whether the current charge amount CURRENT SOC of the battery reaches the maximum charge amount $SOC_{MAX}$ of the battery, the hybrid control unit 40 performs a control of discharging a part of the current charge amount CURRENT SOC of the battery before the actual regenerative braking (i.e., before applying the regenerative braking torque to the motor in the step S106) S109.

If the current charge amount of the battery is fully charged due to the regenerative braking, the regenerative braking prohibition condition according to the maximum charge amount state of the battery is executed, such that the braking of the vehicle is performed by the 100% hydraulic brake pressure. The braking load may be concentrated on the disk included in the hydraulic braking device, thereby reducing the life of the disk and the durability thereof.

In order to prevent the problem described above, the hybrid control unit 40 performs a control of discharging a part of the current charge amount of the battery so that the current charge amount of the battery does not become the maximum charge amount by the power generation by the regenerative braking as in the step S109.

When the hybrid control unit 40 performs the battery discharge control, the discharge amount thereof is determined by the battery chargeable amount calculated in the step S104.

At this time, the discharge control by the hybrid control unit 40 may consume a part of the current charge amount of the battery through a control of driving the motor for a certain time in the hybrid control unit 40.

Alternatively, the discharge control by the hybrid control unit 40 may consume a part of the current charge amount of the battery through a control of driving one accessory part selected among accessory parts such as a defroster, a fog lamp, a heater, and an air-conditioner.

The hybrid control unit 40 receives current usage information (e.g., heating or cooling information) of a Full Automatic Temperature Control System (FATC) control unit, which is a control unit of an air-conditioner for the vehicle to selectively drive the heater or the air conditioner, thereby consuming a part of the current charge amount of the battery.

As described above, when it is determined that the current charge amount of the battery reaches the maximum charge amount of the battery by predicting whether the current charge amount of the battery reaches the maximum charge amount of the battery, it is possible to forcibly discharge a part of the current charge amount of the battery to exclude the regenerative braking prohibition condition according to the maximum charge amount state of the battery, thereby inducing so that the braking of the vehicle is always performed by a sum of the regenerative braking amount and the hydraulic braking amount.

In addition, unlike the conventional case where the braking of the vehicle is performed by only the 100% hydraulic brake pressure by the regenerative braking prohibition logic, the braking of the vehicle may always be performed by a sum of the regenerative braking amount and the hydraulic braking amount, thereby reducing the braking load concentrated on the disk of the hydraulic braking device (e.g., upon braking by the 100% hydraulic brake pressure) and maintaining the durability life of the disk.

In addition, by reducing the braking load concentrated on the disk of the hydraulic braking device, it is possible to reduce the size of the disk, thereby reducing weight and saving cost.

What is claimed is:

1. A braking control system for an environmental-friendly vehicle comprising:
    a battery control unit for providing current charge amount information of a battery; and
    a hybrid control unit for performing a control of discharging a part of the current charge amount of the battery before an actual regenerative braking occurs when the current charge amount of the battery is determined to reach a maximum charge amount of the battery by predicting whether the current charge amount of the battery provided by the battery control unit reaches the maximum charge amount of the battery by power generation according to a regenerative braking of a motor when the regenerative braking of the motor is performed at or above a certain vehicle speed.

2. The braking control system for the environmental-friendly vehicle of claim 1,
    wherein the hybrid control unit executes the control of discharging when a sum of the current charge amount of the battery provided by the battery control unit and a battery chargeable amount by the regenerative braking of the motor is greater than the maximum charge amount of the battery.

3. The braking control system for the environmental-friendly vehicle of claim 1,
    wherein the control of discharging by the hybrid control unit is performed through a control of driving the motor for a certain time in the hybrid control unit.

4. The braking control system for the environmental-friendly vehicle of claim 1,
    wherein the control of discharging by the hybrid control unit is performed by a control of driving one selected among a defroster, a fog lamp, a heater, and an air-conditioner in the hybrid control unit.

5. The braking control system for the environmental-friendly vehicle of claim 4,
    wherein the hybrid control unit receives current usage information of a FATC control unit to selectively drive the heater or the air-conditioner.

6. A braking control method for an environmental-friendly vehicle comprising:
    providing current charge amount information of a battery to a hybrid control unit in a battery control unit; and
    performing a control of discharging a part of the current charge amount of the battery before an actual regenerative braking occurs when the current charge amount of the battery is determined to reach a maximum charge amount of the battery by predicting whether the current charge amount of the battery provided by the battery control unit reaches the maximum charge amount of the battery by power generation according to a regenerative braking of a motor in the hybrid control unit.

7. The braking control method for the environmental-friendly vehicle of claim 6,
    wherein the hybrid control unit executes the control of discharging when a sum of the current charge amount of the battery provided by the battery control unit and a battery chargeable amount by the regenerative braking of the motor is greater than the maximum charge amount of the battery.

8. The braking control method for the environmental-friendly vehicle of claim 6,
    wherein the control of discharging by the hybrid control unit is performed through a control of driving the motor for a certain time in the hybrid control unit.

9. The braking control method for the environmental-friendly vehicle of claim 6,
    wherein the control of discharging by the hybrid control unit is performed through a control of driving one selected among a defroster, a fog lamp, a heater, and an air-conditioner in the hybrid control unit.

10. The braking control method for the environmental-friendly vehicle of claim 9,
    wherein the hybrid control unit receives current usage information of a FATC control unit to selectively drive the heater or the air-conditioner.

\* \* \* \* \*